United States Patent Office 3,344,152
Patented Sept. 26, 1967

3,344,152
PURIFICATION OF BENZENETETRACARBOXYLIC DIANHYDRIDES
William D. Vanderwerff, West Chester, Pa., assignor to Sun Oil Company, Philadelphia, Pa., a corporation of New Jersey
No Drawing. Filed Jan. 8, 1965, Ser. No. 424,190
11 Claims. (Cl. 260—346.3)

This invention is a means of removing nitrogenous impurities from benzenetetracarboxylic dianhydrides obtained by dehydration of the corresponding tetracarboxylic acid, the latter being obtained by the nitric oxidation of certain types of aromatics. The invention involves selective dissolution of the dianhydride in the form of a complex in a solvent of a certain type followed by recovery of the complex from the resulting solution and decomposition of the complex to obtain the purified dianhydride.

Pyromellitic dianhydride (1,2,4,5-benezenetetracarboxylic dianhydride, herein PMDA) is widely used in the manufacture of polyimide films having excellent high temperature stability. Mellophanic dianhydride (1,2,3,4-benzenetetracarboxylic dianhydride) can also be used but it is not nearly as desirable as PMDA. One method of preparing these dianhydrides involves the $HNO_3$ oxidation of a suitable starting material such as durene, sym-octahydroanthracene (herein OHA), sym-octahydrophenanthrene (herein OHP) to form benzenetetracarboxylic acid followed by dehydration of the latter to the corresponding dianhydride. A disadvantage of this method is that the tetracarboxylic acid contains nitrogenous impurities which are not removed in the dehydration step and which therefore contaminate the final dianhydride product. These impurities are extremely difficult to remove. In manufacturing polyimide film the dianhydride starting material must be extremely pure for otherwise the film will not have satisfactory properties. Consequently a means of removing the nitrogenous impurities from dianhydrides made in the manner described is desired. Such a method has now been found.

The preparation of pyromellitic acid (herein PMA) and mellophanic acid by the nitric acid oxidation of certain types of starting materials is known. For example, U.S. Patent No. 2,970,169 describes the preparation of PMA by the $HNO_3$ oxidation of durene. The process of this patent is also applicable to the formation of mellophanic acid from 1,2,3,4-tetramethylbenzene. In my copending application Serial No. 370,485 filed May 27, 1964 the $HNO_3$ oxidation of OHA and OHP to PMA and mellophanic acid respectively is disclosed and claimed. As described therein the oxidation is effected by contacting the OHA or OHP with a molar excess of 30–60% aqueous $HNO_3$ at a temperature of 160°–220° C. Preferably the acid strength is 35–55% and the temperature is 170°–190° C. A molar excess of $HNO_3$ is present when the $HNO_3$:starting material mole ratio is greater than 44:3 since the oxidation involves the reaction of 44 moles $HNO_3$ with 3 moles OHA or OHP. Preferably a 5–50% molar excess of $HNO_3$ is employed. The reaction is carried out in a pressure vessel and after a reaction time of 0.1–30 minutes, preferably 0.1–10 minutes, the vessel is opened whereupon gaseous by-products escape. The remaining reaction product mixture comprises PMA or mellophanic acid, water, a small amount of by-products, and some of the excess $HNO_3$. Some of the tetracarboxylic acid product is dissolved in the $HNO_3$ and the remainder is a solid precipitate. The latter is separated after which the $HNO_3$ solution is cooled to, say, 5° C. and the resulting crystallized tetracarboxylic acid is then separated.

The OHA and OHP starting materials can be obtained by known methods, e.g., by selective hydrogenation of anthracene or phenanthrene as described in French Patent 1,365,023. They can also be obtained by the procedure described in the copending application of R. D. Bushick, Serial No. 388,693, filed August 10, 1964, and now abandoned, wherein the disproportionation of tetralin to a mixture of OHA and OHP in the presence of $HF$–$BF_3$ as catalyst is disclosed and claimed. The HF is employed in liquid phase and is used in the amount of at least 1 mole, preferably at least 8 moles, per mole of tetralin. The amount of $BF_3$ should be at least 0.5 mole, preferably at least 0.7 mole, per mole of tetralin. The disproportionation temperature should be 15°–110° C., preferably 25°–80° C., with maximum yield of product being obtained at about 50° C. After a reaction time of 30–600 minutes, preferably 60–300 minutes, the reaction vessel is opened which effects removal of most of the $BF_3$ and also most of the HF if the reaction temperature is higher than 19.4° C., the boiling point of HF. Any remaining HF and $BF_3$ can be distilled from the vessel. After removal of HF and $BF_3$ a mixture of OHA and OHP is recovered from the remaining reaction mixture by, e.g., fractional distillation at about 0.1 mm. Hg. At this pressure they distill off between 80° and 85° C. The OHA and OHP are distilled off together and the resulting mixture is condensed and cooled to room temperature. This cooling effects crystallization of solid OHA (M.P. 74° C.) and it is then separated from the liquid OHP (M.P. 16.7° C.). The separated OHA can if desired be further purified by recrystallization from methanol.

The tetracarboxylic acid made by $HNO_3$ oxidation of any of the materials described above is usually light yellow in color and it contains nitrogenous impurities, the amount of the latter usually being 0.05–1.5% as nitrogen (N). In the case of PMA the material responsible for the yellow color can be essentially completely removed by washing the acid with an ester such as ethyl acetate, methyl butanoate, etc. or with a chlorinated or brominated hydrocarbon such as chloroform, chlorobenzene, bromonaphthalene, etc. These procedures are described in the copending application of R. H. Shinn, Serial No. 393,363, filed August 31, 1964, and now abandoned. Other decolorization procedures, applicable to both PMA and mellophanic acid, are known. For example, decolorization by means of activated carbon is described in U.S. Patent 2,937,189 issued to Hoffman.

The pyromellitic or mellophanic acid can be converted to the dianhydride by known methods. Both of these acids form their dianhydrides when heated until molten. See, for example, Chemistry of the Carbon Compounds, vol. 3, pp. 867–8, Elsevier (1956). Another method of obtaining PMDA is by heating PMA in the solid state at a temperature between 170° C. and the melting point of the acid and removing the resulting water vapor from the heating zone, such a procedure being described in the aforesaid Hoffman patent.

As mentioned above, pyromellitic or mellophanic dianhydride prepared by any of the methods described above contains nitrogenous impurities usually in the amount of 0.05–1.5%, as N. All percentages and parts herein are by weight unless otherwise indicated. These impurities are introduced in the oxidation step and they are not removed in the dehydration step whereby the acid is dehydrated to the dianhydride. The invention is a means of removing all or at least a substantial portion of these nitrogenous impurities.

The steps involved in the invention and what is believed to be the theoretical explanation therefor are as follows:

The impure dianhydride is mixed at an elevated temperature with a relatively large amount of a solvent of a certain type. By impure dianhydride is meant the dianhydride itself (hereinafter referred to as the dianhydride)

plus the nitrogenous impurities associated therewith. Upon such mixing the dianhydride and, it is believed, also the nitrogenous impurities dissolve in the solvent. The dianhydride immediately reacts with a portion of the solvent to form a dianhydride-solvent complex which remains dissolved in excess solvent. The dissolved nitrogenous impurities also react with some of the solvent to form a complex but this complex is insoluble in excess solvent and immediately precipitates therefrom. The insoluble complex of the impurities is separated and the remaining solution is then cooled to crystallize the dianhydride-solvent complex which is then separated. Finally the dianhydride-solvent complex is heated to decompose same and purified dianhydride is thereby obtained.

The impure dianhydride is initially dissolved in a relatively large amount of solvent. The solvent can be indan or tetralin with the latter being preferred. Although the reason therefor is not known with certainty conventional solvents such as the xylenes and other alkyl benzenes are not suitable for the present purpose. The amount of solvent employed must be sufficient to dissolve the dianhydride, form the dianhydride-solvent complex, and then dissolve the complex. It will depend upon the quantity of impure dianhydride, the purity of the latter, and the temperature of the solvent. Formation of the complex requires 1 mole of solvent per mole of dianhydride. The purity of the impure dianhydride will almost invariably be over 85–90%. In many cases, especially when subjected to a preliminary purification such as with activated carbon or the procedure described in the Shinn application supra, the purity will be above 95%, more frequently above 98%. At room temperature the solubility of the dianhydride in the solvent is very small but the solubility increases rapidly at elevated temperatures. To achieve substantial solubility of the dianhydride the solvent should be at a temperature of at least 75° C. and is preferably at a temperature of at least 125° C. Although solvent temperatures as high as about 300° C. can be used, temperatures above the boiling point of the solvent (207° C. and 176° C. at 760 mm. Hg for tetralin and indan respectively) are less desirable because they require the use of superatmospheric pressure. Furthermore, as the temperature increases the solubility of the impurity-solvent complex in the solvent increases and becomes appreciable over 300° C. Consequently the temperature should not exceed 300° C. and preferably is not over 250° C. Within the temperature range of 75°–300° C. the amount of solvent employed should be at least 4 moles per mole of dianhydride because this amount will normally be sufficient to dissolve essentially all of the dianhydride, form the dianhydride-solvent complex, and dissolve the latter in excess solvent. Below this amount of solvent some dianhydride may remain undissolved and be subsequently separated with the impurities which is obviously undesirable. In any event the amount of solvent used should be sufficient so that a substantial amount, preferably all, of the dianhydride is dissolved in the solvent in the form of the complex. In order to promote rapid dissolution of the dianhydride the amount of solvent is preferably at least 10 moles per mole of dianhydride. Amounts of solvent as high as 100–150 moles per mole of dianhydride can be used but in order to reduce the amount of dissolved impurity-solvent complex, which is extremely small in any event, the amount of solvent is preferably not more than 50 moles per mole of solvent.

It is believed that the impurities dissolve in the solvent and then react to form an impurity-solvent complex which precipitates from the excess solvent rather than the impurities per se being insoluble in the solvent. This would mean that the amount of solvent must be enough not only to form and dissolve the dianhydride complex but also to form the impurity complex. In any event, whatever the actual mechanism may be with respect to the impurities the use of amounts of solvent as described above is sufficient for the present purpose. In other words, so long as the amount of solvent is sufficient to complex with the dianhydride and then dissolve the resulting complex, the amount is satisfactory for the present purpose.

The resulting solution of the dianhydride-solvent complex in excess solvent contains insoluble matter, the latter being or at least containing the nitrogenous impurities. The insoluble matter is then separated by any conventional means such as centrifugation, filtration, but preferably by filtration using a filter aid such as diatomaceous earth. The insoluble matter in the solution of the complex in solvent is ordinarily not visible to the unaided eye, at least when the purity of the impure dianhydride is over 95% as is usually the case. However when the solution is filtered through filter aid the insoluble matter can usually be observed as a scum on the filter aid.

The separation of the insoluble matter should be at about the same temperature at which the dissolution of the dianhydride took place, i.e., 75°–300° C. If cooled excessively dianhydride-solvent complex will crystallize from the solution and will be removed with the nitrogenous impurities, an obviously undesirable event in that it reduces the yield of purified dianhydride.

When the solution of dianhydride-solvent complex in excess solvent is filtered through a filter aid, e.g., diatomaceous earth, the filter aid will naturally contain at the end of the filtration cycle some of the solution. This solution can be washed out of the filter cake with additional hot solvent and the complex recovered from the wash solvent by crystallization means described infra.

After separating the insoluble matter from the solution of dianhydride-solvent complex in excess solvent, the remaining solution contains purified dianhydride. Although the dianhydride in the solution is in the form of a complex the ratio of the dianhydride to nitrogenous impurities is substantially higher than in the impure dianhydride starting material. The solution of the PMDA complex is then treated to effect recovery of the PMDA. One technique involves cooling the solution of effect crystallization of the complex. Preferably the solution is cooled to room temperature (25° C.) or lower, e.g., 0° C., since at these temperatures well over 90–95% of the complex in the solution will crystallize almost regardless of the amount of solvent present. At and below room temperature the solubility of the complex in the solvent is almost insignificant. Higher crystallization temperatures, e.g., 50°–100° C., can of course be employed but the yield of crystallized complex will of course be reduced.

The crystallized complex is then separated by conventional means, e.g., filtration, centrifugation, etc. and the separated solvent is then preferably used in the purification of additional impure dianhydride. The separated complex is then heated to decompose the complex, i.e., to distill off the solvent component thereof. At 100° C. and 760 mm. Hg pressure decomposition occurs but only slowly. It can be hastened by heating to above the boiling point of the solvent component and this is facilitated by heating under vacuum. In most cases the complex will not be heated above about 275° C. The vaporized solvent is condensed and reused and the residue is purified dianhydride. The residue will normally not contain more than 0.02% nitrogen, usually not more than 0.01% nitrogen (as N).

A preferred manner of practicing the invention involves carrying out the dehydration of the benzenetetracarboxylic acid to the dianhydride and dissolution of the latter in the solvent in a single operation. In this embodiment the tetracarboxylic acid is mixed with the specified amount of solvent. Since the acid is insoluble in the solvent the result is a slurry of the acid in the solvent. This slurry is then heated to dehydrate the acid and convert it to the dianhydride with the resulting water vapor being removed from the heating zone during the heating step. The rate of dehydration of the acid to the dianhydride is dependent mainly upon the rate at which the resulting water vapor is removed from the heating zone. Preferably the water vapor is removed essentially as fast as it is formed, by e.g., sweeping it out with nitrogen, the use of molecular sieves, etc. in which case the dehydration is complete in several minutes. The dianhydride is soluble in the solvent and dissolves in the latter essentially as fast as it is formed. After the dianhydride dissolves in the solvent the procedure is the same as described above.

The following examples specifically illustrate the invention.

*Example 1*

The starting material is essentially pure OHA prepared by the $HF-BF_3$ catalyzed disproportionation of tetralin. The OHA is oxidized to PMA by treatment with a 20% molar excess of 45% $HNO_3$ at 180° C. for 15 minutes. The PMA produced has a light yellow color and contains 0.3% nitrogen as N. The PMA is washed with 5 ml. benzene per gram of PMA and the resulting wet PMA is then dried in a vacuum oven. The dried PMA still contains 0.3% nitrogen but is almost white in color.

10 parts of this decolorized PMA is placed in a vacuum oven and heated to 225° C. for 1 hour under 28″ Hg vacuum. At the end of the heating period the acid is completely converted to PMDA (about 8.6 parts) and the latter is found by analysis to also contain 0.3% N. The nitrogen content of the PMDA is actually very slightly higher than 0.3% because of the difference in molecular weight between PMDA and PMA. However, the analytical method used to determine the nitrogen content will not detect this small increase.

The PMDA is then mixed at room temperature with 100 parts tetralin in a large beaker which is open to the atmosphere and which is equipped with heating and agitation means. The mixture is heated to 205° C. and is held at this temperature with agitation until the PMDA dissolves in the tetralin. Dissolution of the PMDA occurs within several minutes and is evidenced by the apparent disappearance of solid material in the tetralin, the term apparent being used because there is insoluble matter containing nitrogenous impurities in the tetralin after dissolution of the PMDA but it is not visible to the unaided eye. Dissolution of the PMDA is also evidenced by a change in color of the tetralin to orange-yellow which is due to the formation of the PMDA-tetralin complex which occurs almost simultaneously with the dissolution of the PMDA in the tetralin.

The solution of PMDA-tetralin complex in tetralin is then filtered at 205° C. through a bed of diatomaceous earth supported on a sintered glass filter. After the filtration is complete a brown scum is visible on the surface of the bed of filter aid.

The filtrate is cooled to room temperature and the resulting crystallized material, the PMDA-tetralin complex, is separated by filtration. The complex is then placed in a vacuum oven and heated to 100° C. under 28″ Hg vacuum. After 30 minutes the tetralin component of the complex is completely removed. The resulting PMDA contains 0.005% nitrogen.

*Example 2*

10 parts of decolorized PMA (N content of 0.3%) prepared in the same manner as in Example 1 is mixed with 100 parts tetralin at room temperature in the open beaker used in Example 1. The resulting slurry of PMA in tetralin is heated to about 205° C. and held thereat for 1 hour during which time the PMA dehydrates to PMDA. The water vapor formed during the dehydration, and some tetralin vapor, escapes to the atmosphere. Complete conversion of the PMA to PMDA is evidenced by the apparent disappearance of solid material in the tetralin, due to the dissolution of the PMDA in the tetralin, and by the change in color of the tetralin to orange-yellow which is due to formation of the complex.

After the PMDA dissolves in the tetralin the procedure is the same as in Example 1. The PMDA finally recovered contains 0.005% N.

Substantially the same results as in Examples 1 and 2 are obtained when the solvent is indan or when the impure dianhydride starting material is mellophanic dianhydride made in the manner described.

*Example 3*

88 parts of o-xylene is charged to a pressure vessel along with 10 parts decolorized PMA prepared in the same manner as in Example 1. The PMA contains 0.3% nitrogen. Next 15 parts of Lindy Molecular Sieves, type 5AKW, 1/16-inch pellets, are added to the o-xylene-PMA slurry. The purpose of the molecular sieves is to take up the water formed when the PMA is dehydrated. The vessel is shaken, heated under pressure to 205° C. and held at this temperature for 1 hour. At the end of this time the contents of the bomb appears as a homogeneous solution except, of course, for the molecular sieves. The contents are then filtered at 205° C. in the pressure filter using diatomaceous earth as a filter aid. The filtrate is cooled to 25° C. and the resulting crystallized o-xylene-PMDA complex separated. The complex is heated to 100° C. under a vacuum of 28″ Hg for 30 minutes to decompose same. The PMDA thereby obtained is found by analysis to contain 0.3% nitrogen. In other words no removal of nitrogenous impurities is effected when the solvent is o-xylene.

*Example 4*

The procedure is the same as in Example 3 except that the solvent is m-xylene and a temperature of 150° C. instead of 205° C. is employed. The lower temperature should reduce the solubility of the nitrogenous impurities, either per se or as a complex, in the solvent. The results are the same as in Example 3, i.e., the PMDA finally recovered has the same nitrogen content as the starting material.

*Example 5*

The procedure is the same as in Example 3 except that the solvent is p-xylene. The results are the same as in Example 3, i.e., the PMDA finally recovered has the same nitrogen content as the starting material.

The invention claimed is:

1. Method of removing nitrogenous impurities from a benzenetetracarboxylic dianhydride containing same, said dianhydride being obtained by dehydration of a benzenetetracarboxylic acid selected from the group consisting of pyromellitic acid and mellophanic acid, said acid having been obtained by the nitric acid oxidation of a material selected from the group consisting of tetraalkylbenzenes, octahydroanthracene, and octahydrophenanthrene, which comprises (1) reacting the impure dianhydride with at least 1 mole per mole of dianhydride of a material selected from the group consisting of tetralin and indan to form a dianhydride-material complex, (2) mixing the reaction mixture at 75°–300° C. with an additional quantity of said material to dissolve said complex therein, whereby there is obtained a solution of said complex in said material which solution also contains insoluble, nitrogen-containing matter, (3) separating said insoluble matter from said solution, and (4) recovering dianhydride from the solution free of insoluble matter, whereby purified dianhydride is obtained.

2. Method of removing nitrogenous impurities from a benzenetetracarboxylic dianhydride containing same, said dianhydride being obtained by dehydration of a benzenetetracarboxylic acid selected from the group consisting of pyromellitic acid and mellophanic acid, said acid having been obtained by the nitric acid oxidation of a material selected from the group consisting of tetraalkylbenzenes, octahydroanthracene, and octahydrophenanthrene which comprises, (1) contacting the impure dianhydride with at least 4 moles per mole of dianhydride of a solvent selected from the group consisting of tetralin and indan, said contacting being at a temperature in the range of 75°–300° C. sufficient to effect dissolution in said solvent of a substantial part of the dianhydride whereby dianhydride and the nitrogenous impurities associated therewith dissolve in said solvent, the dissolved dianhydride reacts with a portion of the solvent to form a complex which remains dissolved in remaining solvent and the dissolved nitrogenous impurities react with another portion of said solvent to form a complex which being insoluble in said solvent precipitates therefrom, (2) removing insoluble matter from the solvent solution of said dianhydride-solvent complex, (3) cooling the remaining solution to crystallize the dianhydride-solvent complex therefrom, (4) separating the crystallized dianhydride-solvent complex, and (5) heating the separated complex to remove solvent therefrom whereby purified dianhydride is obtained.

3. Method according to claim 2 wherein said temperature is in the range of 125°–250° C.

4. Method according to claim 2 wherein the amount of first mentioned solvent is at least 10 moles per mole of dianhydride.

5. Method according to claim 2 wherein said solvent is tetralin.

6. Method according to claim 2 wherein said dianhydride is pyromellitic dianhydride obtained by the dehydration of pyromellitic acid obtained by the HNO₃ oxidation of octahydroanthracene.

7. Method according to claim 2 wherein said dehydration is carried out in the presence of solvent used in step (1).

8. Method of removing nitrogenous impurities from pyromellitic dianhydride containing same, said dianhydride being obtained by dehydration of pyromellitc acid obtained by the nitric acid oxidation of octahydroanthracene which comprises, (1) contacting said impure pyromellitic dianhydride with at least 4 moles per mole of dianhydride of tetralin, said contacting being at a temperature in the range of 75°–300° C. sufficient to effect dissolution in said tetralin of a substantial part of the pyromellitic dianhydride, whereby pyromellitic dianhydride and the nitrogenous impurities associated therewith dissolve in said solvent, the dissolved dianhydride reacts with a portion of said tetralin to form a complex which remains dissolved in remaining tetralin and the dissolved nitrogenous impurities react with another portion of said tetralin to form a complex which being insoluble in tetralin precipitates therefrom, (2) removing insoluble matter from the tetralin solution of said dianhydride-tetralin complex, (3) cooling the remaining solution to crystallize the dianhydride-tetralin complex therefrom, (4) separating the crystallized dianhydride-tetralin complex, and (5) heating the separated complex to remove tetralin therefrom whereby purified pyromellitic dianhydride is obtained.

9. Method according to claim 8 wherein said temperature is in the range of 125°–250° C.

10. Method according to claim 8 wherein the amount of the first-mentioned tetralin is at least 10 moles per mole of dianhydride.

11. Method according to claim 8 wherein said dehydration is carried out in the presence of solvent used in step (1).

References Cited
UNITED STATES PATENTS 3,106,568  10/1963  Spaeth _____ 260—346.3

ALTON D. ROLLINS, *Primary Examiner.*

B. DENTZ, *Assistant Examiner.*